US008947063B2

(12) United States Patent
Zhang et al.

(10) Patent No.: US 8,947,063 B2
(45) Date of Patent: Feb. 3, 2015

(54) POWER CONVERTER WITH THE FUNCTION OF DIGITAL ERROR CORRECTION

(75) Inventors: Bo Zhang, Chengdu (CN); Shaowei Zhen, Chengdu (CN); Ping Luo, Chengdu (CN); Xiaohui Zhu, Chengdu (CN); Jiangkun Li, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 13/637,298

(22) PCT Filed: Mar. 7, 2011

(86) PCT No.: PCT/CN2011/071566
§ 371 (c)(1),
(2), (4) Date: Sep. 25, 2012

(87) PCT Pub. No.: WO2012/113162
PCT Pub. Date: Aug. 30, 2012

(65) Prior Publication Data
US 2013/0335045 A1    Dec. 19, 2013

(30) Foreign Application Priority Data
Feb. 25, 2011    (CN) .......................... 2011 1 0046516

(51) Int. Cl.
*G05F 1/00*    (2006.01)
*H02M 3/158*    (2006.01)
(Continued)

(52) U.S. Cl.
CPC .............. *H02M 3/158* (2013.01); *H02M 3/157* (2013.01); *H02M 3/1588* (2013.01); *H02M 2001/0016* (2013.01); *H02M 2001/0025* (2013.01); *Y02B 70/1466* (2013.01)

USPC .......................................... 323/283; 323/271

(58) Field of Classification Search
CPC .............. H02M 2001/0016; H02M 2001/0025
USPC .......... 323/222–225, 234, 271–275, 282–285
See application file for complete search history.

(56) References Cited

U.S. PATENT DOCUMENTS 5,914,633 A * 6/1999 Comino et al. ................ 327/553
6,603,356 B1 * 8/2003 Kim et al. ..................... 330/265
(Continued)

FOREIGN PATENT DOCUMENTS

CN    1922779    2/2007
CN    1980024    6/2007
(Continued)

*Primary Examiner* — Timothy J Dole
*Assistant Examiner* — Yusef Ahmed
(74) *Attorney, Agent, or Firm* — Caesar, Rivise, Bernstein, Cohen & Pokotilow, Ltd.

(57) ABSTRACT

An output voltage regulator of step-down switching power converters is described, with the regulator provided with digitally adjusted output voltage. It solves the problem of low regulation due to low error amplifier (EA) gain. This invention includes a power converter with the function of Digitally Error Correction, having Logic Control, EA, PWM comparator, Driver, power devices and passive components. A Digital Calibration Circuit whose input terminal is connected to the output voltage and output terminal is connected to the error signal. When the output voltage exceeds the tolerance range, this Digital Calibration Circuit will increase or decrease the error signal step by step, keeping the output voltage in the tolerance range. The Digital Calibration Circuit can be applied not only in nanometer scale process, but also in traditional process. For those power converters in traditional process, it is also quite promising in applications.

3 Claims, 3 Drawing Sheets

(51) Int. Cl.
*H02M 3/157* (2006.01)
*H02M 1/00* (2006.01)

(56) References Cited

U.S. PATENT DOCUMENTS

| | | | |
|---|---|---|---|
| 7,315,152 B1* | 1/2008 | Epperson et al. | 323/271 |
| 7,622,820 B1* | 11/2009 | Prodic et al. | 307/31 |
| 8,207,711 B2* | 6/2012 | Crawford et al. | 323/207 |
| 8,270,190 B2* | 9/2012 | Adragna | 363/89 |
| 8,604,962 B1* | 12/2013 | Lewyn | 341/162 |
| 2006/0087339 A1* | 4/2006 | Chung et al. | 326/30 |
| 2007/0030067 A1* | 2/2007 | Brueske | 330/254 |
| 2007/0085523 A1* | 4/2007 | Scoones et al. | 323/314 |
| 2007/0139103 A1* | 6/2007 | Roeckner et al. | 330/10 |
| 2007/0257650 A1* | 11/2007 | Southwell et al. | 323/283 |
| 2008/0310046 A1* | 12/2008 | Menegoli et al. | 360/75 |
| 2009/0167271 A1* | 7/2009 | Tang et al. | 323/283 |
| 2009/0322303 A1* | 12/2009 | Hirata et al. | 323/284 |
| 2010/0134083 A1* | 6/2010 | Trescases | 323/283 |
| 2011/0186359 A1* | 8/2011 | Chen et al. | 178/18.06 |
| 2011/0260537 A1* | 10/2011 | Tang et al. | 307/55 |
| 2013/0249518 A1* | 9/2013 | Giannopoulos | 323/284 |
| 2013/0320946 A1* | 12/2013 | Luo et al. | 323/283 |

FOREIGN PATENT DOCUMENTS

| | | |
|---|---|---|
| CN | 101656473 | 2/2010 |
| CN | 101951151 | 1/2011 |
| JP | 2010142060 | 6/2010 |
| WO | WO2010/125983 | 11/2010 |

* cited by examiner

POWER CONVERTER WITH THE FUNCTION OF DIGITAL ERROR CORRECTION

CROSS-REFERENCE TO RELATED APPLICATIONS

This national stage application claims the benefit under 35 U.S.C. §371 of International Application No. PCT/CN2011/071566 filed on Mar. 7, 2011, entitled POWER CONVERTER WITH THE FUNCTION OF DIGITAL ERROR CORRECTION, which takes its priority from Chinese Patent Application No. 201110046516.6 filed on Feb. 25, 2011, and all of whose entire disclosures are incorporated by reference herein.

BACKGROUND OF THE INVENTION

1. Field of the Invention

This invention relates to integrated circuit, especially to the output voltage regulator of step-down switching power converters.

2. Background

Integrated power converter plays an important role in power ICs, and has been widely used in electronic products. Step-down switching power converters can be divided into two types, voltage-mode control and current-mode control. Voltage mode step-down switching power converter can greatly decrease the design efforts for its simple control loop. The present voltage-mode step-down switching power converter typically consists of logic control circuit, EA (Error Amplifier), PWM (Pulse Width Modulation) comparator, driver circuit and the output stage, as shown in FIG. 1. In this figure, the output voltage Vout and the reference voltage Vref are connected to EA, generating two signals V1 and V2 to the PWM comparator 40. One of the input terminals of 40 is connected with sawtooth signal Saw, so that 40 adjusts the duty cycle according to V2. Based on pulses generated by 40, the logic control circuit 29 drives a pair of power MOSFETs 31 and 32 through driver circuit 30, realizing power conversion from the input voltage Vin to the output voltage Vout. This is a typical analog controlled power converter, consisting of two power MOSFETs 31 and 32, an inductor 33, a capacitor 34 and the load resistor 35. With development of the CMOS technology, integrated circuits are stepping towards nanometer scale. Driven by Moore's Law, it is necessary to integrate the switching power converter into SoC with nanometer scale process. However, analog circuit design is faced with many challenges such as the decrease of the intrinsic gain and the signal swing. In traditional Voltage-Mode converters, EA with sufficient gain is essential to satisfy the regulation. With nanometer scale process, it is difficult to design high gain EA. Thus it is almost impossible to achieve the regulation requirements when the load varies in wide region.

BRIEF SUMMARY OF THE INVENTION

This invention solves the problem how to meet the regulation specification, given reductive gain of EA. And the invention benefits the regulation in a digital way.

The invention solves the technology problems mentioned above, and benefits power converter by digital calibrator. The digital calibrator is consist of logic control circuit 43, EA 53, PWM comparator 50, driver circuit 44 and the output stage 69, where EA 53 generates the error signal according to the output voltage Vout and the reference voltage Vref, the PWM comparator 50 generates the duty cycle according to the error signal, and logic control circuit 43 realizes the power conversion by driving power devices with driver circuit 44, according to the pulses generated by the PWM comparator 50. It features digital control circuit 70 whose input terminal is connected to the output voltage and output terminal is connected to the error signal. When the output voltage exceeds the tolerance range, digital control circuit 70 will increase or decrease the error signal step by step, limiting the output voltage in tolerance range.

Specifically, the output stage 69 is made up of a PMOS 45 and a NMOS 46 of which the gates are connected to driver circuit 44 and the drains are connected together as the output terminal. Besides, the source of PMOS 45 is connected with the input voltage Vin, and the source of NMOS 46 is connected to ground.

Specifically, EA 53 uses an OTA (Operational Transconductance Amplifier).

Furthermore, digital control circuit includes two comparators 56 and 57, calibration circuit 68 and the current mirrors 64, 65, 66 and 67. The input terminals of these two comparators 56 and 57 are connected to the output voltage Vout, and the output terminals are connected to calibration circuit 68. And also Calibration Circuit 68 is connected with the current mirrors 64, 65, 66 and 67. According to the outputs of two comparators 56 and 57, the calibration circuit 68 decides which of the current mirrors will be turned on, as a result, the current of the pull-up resistor 52 is increased or decreased, and so is the error signal tuned in step.

Specifically, the first comparator 57 is used to detect the positive deviation of Vout, and the second comparator 56 is used to detect the negative deviation of Vout. If Vout deviates positively for a specified time interval, the number of the current mirrors turned on will be decreased. Similarly, if Vout deviates negatively for the specified time interval, the number will be increased.

The beneficial effect of this invention is that it appends digital control circuit on the basis of conventional analog control circuit. It combines the compact analog circuit with the complicated digital calibration circuit, so that the performance of the power converter can be guaranteed even in the nanometer scale process. Besides, the good robustness of digital circuit can guarantee high yield and stability. The digital calibration circuit 68 of this invention can be applied not only nanometer scale process, but also in traditional process. For those power converters in traditional process, it is also quite promising in widely application.

With the help of the drawings and the case of this invention, the technique of this invention is described next in details.

DETAILED DESCRIPTION OF THE INVENTION

This invention calibrates the traditional analog power converter digitally, with less dependence on process, flexible process transplant ability and a simple calibration scheme. It makes good well use of the advantages of the digital circuit and the analog circuit, and is quite suitable to be applied in nanometer process where it is hard to get excellent performance for the analog circuit, and can be used to improve the performance of traditional switching power converter as well.

Figure 2:
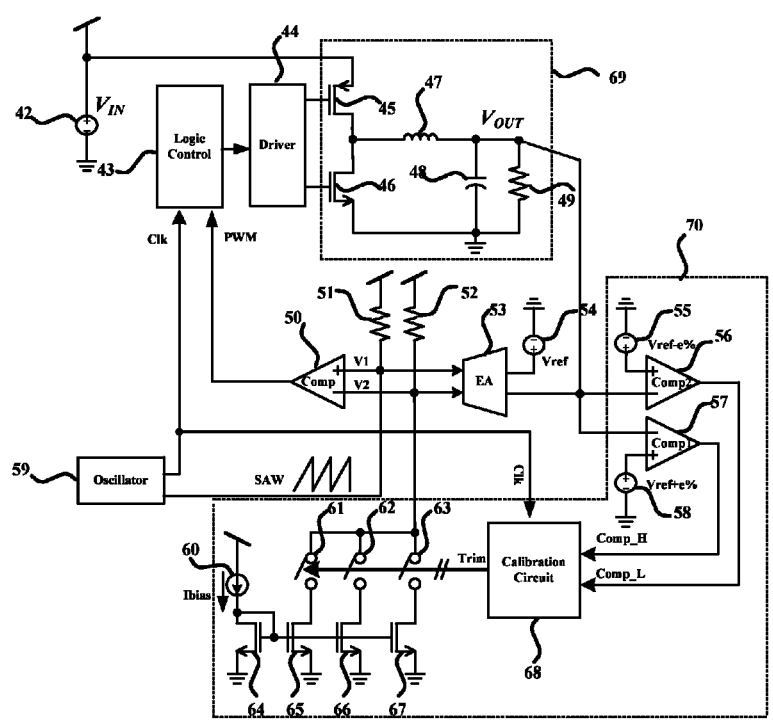
FIG. 2 is a general block diagram of the proposed power converter using the invention.

The power converter with the function of digital calibration is shown in FIG. 2. It consists of logic control circuit 43, EA 53, the PWM comparator 50, driver circuit 44, output stage 69 and digital control circuit 70. The output stage 69 is made up of PMOS 45 and NMOS 46. The gates of 45 and 46 are connected to driver circuit 44, and the drains are connected together as the output port. The source of 45 is connected to Vin, and the source of 46 is connected to ground.

Figure 1:
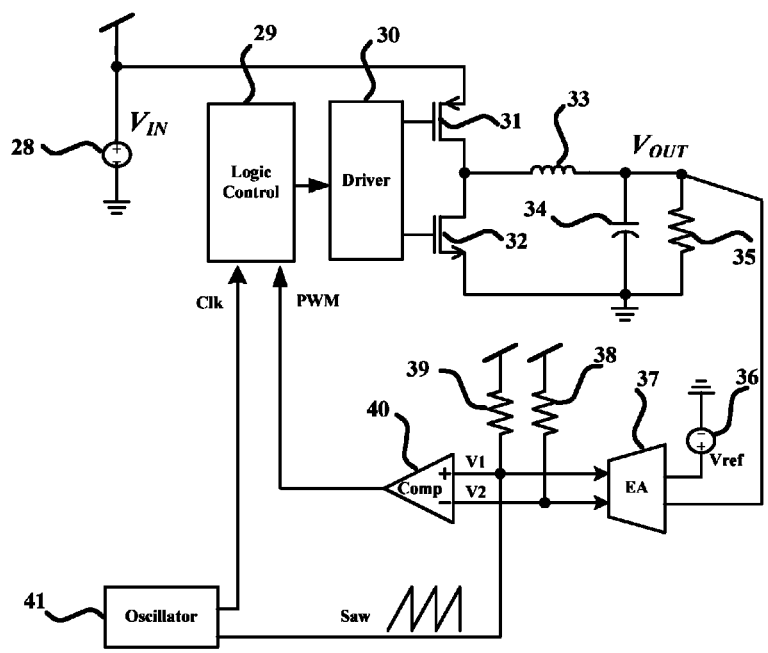
FIG. 1 is a general block diagram of the conventional power converter.

By the comparison between FIG. 1 and FIG. 2, the digital control circuit 70 includes the first comparator 57, the second comparator 56, calibration circuit 68 and three current mirrors 64, 65, 66 and 67. The input terminals of 56 and 57 are connected to Vout, and the output terminals are connected to calibration circuit 68. In FIG. 2, the calibration circuit 68 has an output terminal connected with three current mirrors 64, 65, 66 and 67, and decides the number of the current mirrors turned on according to the output signals of 57 and 56, which are Comp_H and Comp_L respectively. As a result, the current of the pull-up resistor 52 connected with the error signal V2 is changed, and so is V2 changed in step.

According to the error signal V2, the PWM comparator 50 generates Pulse-Width-Modulated wave signal PWM, and then send it to logic control circuit 43. Logic control circuit 43 realizes power conversion from Vin and generates the output voltage Vout through driver circuit 44 driving two power MOSFETs 45 and 46, according to the PWM signal.

In this case, EA 53 has two input signals, the output voltage Vout and the reference voltage Vref and the typical topology is OTA. The outputs of EA 53 are sent to the PWM comparator 50 as input signals. Two resistors 51 and 52 are connected between Vin and the outputs of EA 53. In FIG. 2 the saw current Saw generated by the oscillator 59 is sent to 51, and is used by the PWM comparator 50 to generate PWM signal. The clock signal Clk generated by the oscillator 59 is feed to logic control circuit 43 and calibration circuit 68 as the basic clock signal of the power converter. The input signals of logic control circuit 43 are the Clk and the PWM signal, and the output is connected with driver 44, driving 45 and 46, realizing power conversion. The first comparator 57 and the second comparator 56 are used to detect the positive deviation (Vref+e %) and the negative deviation (Vref-e %) of the output voltage, and outputs Comp_H and Comp_L respectively, which represent the relative position of Vout. When the positive deviation is detected, which means Vout is higher than Vref+e %, Comp_H and Comp_L will both be low (=0). When the negative deviation of Vout is detected, which means Vout is lower than Vref-e %, Comp_H and Comp_L will both be high (=1). As shown in FIG. 2, Comp_H, Comp_L and Clk are the input signals of Calibration Circuit 68. If Comp_H and Comp_L are detected high for N (N=8 in this case) clock periods, the output signal of calibration circuit 68 Trim will increased by 1, increasing the number of the current mirrors turned on and the current in resistor 52, and decreasing the error signal V2. Similarly, if Comp_H and Comp_L are low for N (N=8 in this case) clock cycles, the output signal of calibration circuit 68 Trim will be decreased by 1, decreasing the number of the current mirrors turned on and the current of the resistor 52, increasing the error signal V2. The output signal Trim controls three binary weighted current mirrors through three switches 61, 62 and 63 respectively, and therefore changes the error signal V2 step by step, finely adjusting the duty cycle of the PWM signal through the PWM comparator 50. As shown in FIG. 2, three current mirrors are connected with 52, and will be turned on by closing three switches 61, 62 and 63 respectively. The number of the current mirrors turned on will directly decide the current of 52 and change the error signal V2.

Figure 3:
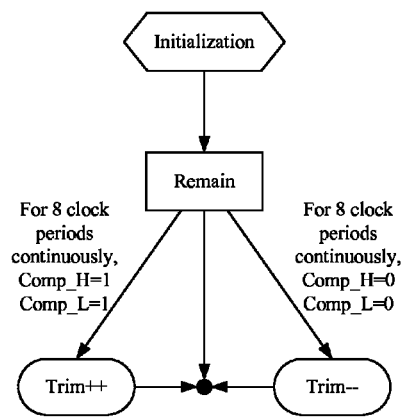
FIG. 3 is the state diagram of the Calibration Circuit 68 of FIG. 2.

FIG. 3 is the state diagram of the calibration circuit 68 shown in FIG. 2. After initialization, the system will keep the output signal Trim. If Comp_H and Comp_L are detected high for N clock period, Trim will be increased by 1. While if Comp_H and Comp_L are detected low for N clock periods, Trim will be decreased by 1.

Figure 4:
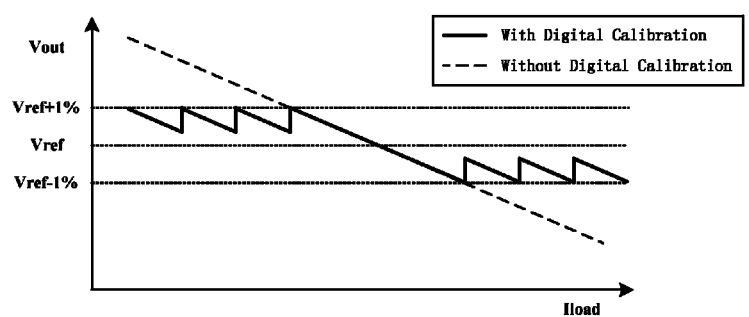
FIG. 4 is the calibration results of the output voltage in the power converter.

FIG. 4 is the calibration results of the output voltage in the power converter. Specifically the deviation range is 1%, which means e=1 in this case. Without the technique of this invention, the output voltage Vout would change greatly when the load varies in a wide range. By contrast, the deviation of Vout can be kept within ±1% of the reference voltage Vref, regardless of different process and temperature conditions, with the digital calibration function of this invention.

What is claimed is:

1. A digital calibration power converter, comprising a logic control circuit, an error amplifier, a pulse width modulation comparator, a driver circuit and an output stage, where the error amplifier generates an error signal according to an output voltage and a reference voltage, the pulse width modulation comparator tunes a duty cycle according to the error signal, and the logic control circuit realizes a power conversion from an input voltage through the driver circuit and generates the output voltage according to pulses produced by the pulse width modulation comparator, the digital calibration power converter including a digital control circuit having input terminals connected to the output voltage, and having output terminals connected to the error signal, when the output voltage exceeds a set range, said digital control circuit increasing or decreasing the error signal in step when the output voltage exceeds the set range to maintain the output voltage in the set range, said error amplifier including an operational transconductance amplifier, said digital control circuit including two comparators, a calibration circuit and current mirrors, the two comparators having input terminals connected to the output voltage, and having output terminals connected to the calibration circuit, the calibration circuit being connected with the current mirrors, the calibration circuit determining a number of the current mirrors turned on according to the outputs of the two comparators so that the current of a pull-up resistor placed at the output of the error amplifier is increased or decreased, and the error signal is changed in step.

2. The digital calibration power converter according to claim 1, the output stage including a PMOS and a NMOS, the PMOS and the NMOS having gates connected to the driver circuit, and further having drains connected together as the output terminal, the PMOS including a source connected with the input voltage, and the NMOS including a source connected to ground.

3. The digital calibration power converter according to claim 1, further comprising a first comparator used to detect the positive deviation of the output voltage and a second comparator used to detect the negative deviation of the output voltage, the number of current mirrors turned on decreased upon the output voltage deviating positively for a specified time, and the number of current mirrors increased upon the output voltage deviating negatively for the specified time.

* * * * *